United States Patent
Yamaguchi et al.

(10) Patent No.: US 8,397,169 B2
(45) Date of Patent: Mar. 12, 2013

(54) IMAGE FORMING SYSTEM CAPABLE OF CAUSING DOCUMENT BOX INFORMATION OF THE PRINTER DRIVER TO AUTOMATICALLY ADJUST TO A CHANGE IN THE DOCUMENT BOX INFORMATION THAT IS STORED IN AN IMAGE FORMING APPARATUS

(75) Inventors: Tetsuji Yamaguchi, Osaka (JP); Daisuke Yoshida, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 1055 days.

(21) Appl. No.: 12/389,036

(22) Filed: Feb. 19, 2009

(65) Prior Publication Data

US 2009/0290195 A1 Nov. 26, 2009

(30) Foreign Application Priority Data

May 20, 2008 (JP) .................. 2008-131469

(51) Int. Cl.
*G06F 17/00* (2006.01)
(52) U.S. Cl. ......... 715/761; 715/204; 715/243; 715/863
(58) Field of Classification Search ................ None
See application file for complete search history.

(56) References Cited

U.S. PATENT DOCUMENTS

| | | | | |
|---|---|---|---|---|
| 3,643,223 A * | 2/1972 | Ruth et al. | .................... | 710/100 |
| 3,659,375 A * | 5/1972 | Stubbmann | ........................ | 446/7 |
| 3,677,453 A * | 7/1972 | Parks et al. | ..................... | 225/93 |
| 3,756,387 A * | 9/1973 | Chaney | ............................. | 206/3 |
| 3,889,273 A * | 6/1975 | Deiss et al. | ................. | 346/33 R |
| 3,931,966 A * | 1/1976 | Walker | ............................ | 473/65 |
| 3,959,803 A * | 5/1976 | Marvel | .......................... | 396/340 |
| 3,968,487 A * | 7/1976 | Herring et al. | ................. | 341/141 |
| 3,976,974 A * | 8/1976 | Hinohara et al. | ............. | 235/382 |
| 3,977,107 A * | 8/1976 | Warren | .......................... | 40/518 |
| 3,985,217 A * | 10/1976 | Kortenhaus et al. | ........... | 194/217 |
| 3,986,284 A * | 10/1976 | Plantinga | ................... | 40/607.03 |
| 4,123,125 A * | 10/1978 | Andry, III | ....................... | 312/35 |
| 4,123,623 A * | 10/1978 | McElliott | ........................ | 379/33 |
| 4,124,775 A * | 11/1978 | Zarouni | ........................ | 379/147 |
| 4,149,795 A * | 4/1979 | Sakurada et al. | .............. | 396/292 |
| 4,181,955 A * | 1/1980 | Mittelman et al. | ........... | 358/1.15 |
| 4,227,318 A * | 10/1980 | Mims | ............................. | 434/337 |
| 4,234,187 A * | 11/1980 | Las | ................................ | 273/248 |

(Continued)

FOREIGN PATENT DOCUMENTS

| | | |
|---|---|---|
| JP | 2002323962 | 11/2002 |
| JP | 2006-135890 | 5/2006 |

(Continued)

*Primary Examiner* — Farhan Syed
(74) *Attorney, Agent, or Firm* — K&L Gates LLP

(57) ABSTRACT

An image forming system including a management device, an image forming apparatus including an auxiliary storage device, and a plurality of information processing devices, which are coupled to one another via a network, the image forming system being configured as follows. The management device is designed to: acquire a box information file regarding a document box created on the auxiliary storage device from the image forming apparatus via the network; and transmit the box information file to each of the plurality of information processing devices in its original format and a state after conversion thereof into a predetermined format. The plurality of information processing devices each control a printer driver compatible with the image forming apparatus to read the received box information file.

10 Claims, 4 Drawing Sheets

U.S. PATENT DOCUMENTS

| | | | | |
|---|---|---|---|---|
| 4,256,149 A * | 3/1981 | Franklin | | 139/453 |
| 4,258,354 A * | 3/1981 | Carmon et al. | | 340/309.4 |
| 4,297,018 A * | 10/1981 | Murakami et al. | | 396/249 |
| 4,310,749 A * | 1/1982 | Gomez et al. | | 235/29 R |
| 4,321,045 A * | 3/1982 | Crowley | | 434/129 |
| 4,323,218 A * | 4/1982 | Plum | | 249/65 |
| 4,344,678 A * | 8/1982 | Mizokami | | 396/260 |
| 4,386,561 A * | 6/1983 | Viaud et al. | | 100/5 |
| 4,400,929 A * | 8/1983 | Iwaki et al. | | 53/580 |
| 4,445,274 A * | 5/1984 | Suzuki et al. | | 29/832 |
| 4,503,593 A * | 3/1985 | Floyd et al. | | 28/263 |
| 4,513,465 A * | 4/1985 | Schambeck | | 14/74.5 |
| 4,519,510 A * | 5/1985 | Learnard | | 211/131.1 |
| 4,524,871 A * | 6/1985 | Klinger | | 206/233 |
| 4,535,888 A * | 8/1985 | Nusselder | | 206/311 |
| 4,604,677 A * | 8/1986 | Suzuki et al. | | 361/729 |
| 4,607,784 A * | 8/1986 | Calabrese | | 229/115 |
| 4,621,020 A * | 11/1986 | Tashiro et al. | | 428/361 |
| 4,757,909 A * | 7/1988 | Matsuura | | 220/7 |
| 4,759,111 A * | 7/1988 | Cudini | | 29/523 |
| 4,911,788 A * | 3/1990 | Pittman et al. | | 162/145 |
| 5,230,378 A * | 7/1993 | Kelley | | 164/16 |
| 5,312,316 A * | 5/1994 | Wu | | 493/123 |
| 5,489,038 A * | 2/1996 | Delbrouck | | 220/6 |
| 5,536,343 A * | 7/1996 | Kuse | | 156/73.3 |
| 5,588,585 A * | 12/1996 | McClure | | 229/191 |
| 5,743,771 A * | 4/1998 | Yamaguchi et al. | | 439/752.5 |
| 6,018,816 A * | 1/2000 | Tateyama | | 714/746 |
| 6,059,180 A * | 5/2000 | Collins | | 229/120.13 |
| 6,077,756 A * | 6/2000 | Lin et al. | | 438/401 |
| 6,131,805 A * | 10/2000 | Gasior | | 229/174 |
| 7,385,928 B2 * | 6/2008 | Suzuki | | 370/242 |
| 2002/0163667 A1 | 11/2002 | Noda | | |
| 2004/0156055 A1* | 8/2004 | Matsui et al. | | 358/1.1 |
| 2004/0236862 A1* | 11/2004 | Ito et al. | | 709/230 |
| 2006/0055968 A1 | 3/2006 | Sato et al. | | |
| 2006/0221390 A1 | 10/2006 | Tomita et al. | | |
| 2007/0044040 A1 | 2/2007 | Takahashi et al. | | |
| 2008/0007778 A1 | 1/2008 | Noda | | |
| 2009/0080013 A1 | 3/2009 | Sato et al. | | |
| 2010/0141995 A1 | 6/2010 | Tomita et al. | | |

FOREIGN PATENT DOCUMENTS

| | | |
|---|---|---|
| JP | 2006287806 | 10/2006 |
| JP | 2006323610 | 11/2006 |
| JP | 2007049268 | 2/2007 |
| JP | 2005039411 | 2/2012 |
| WO | WO2006123806 | 11/2006 |

* cited by examiner

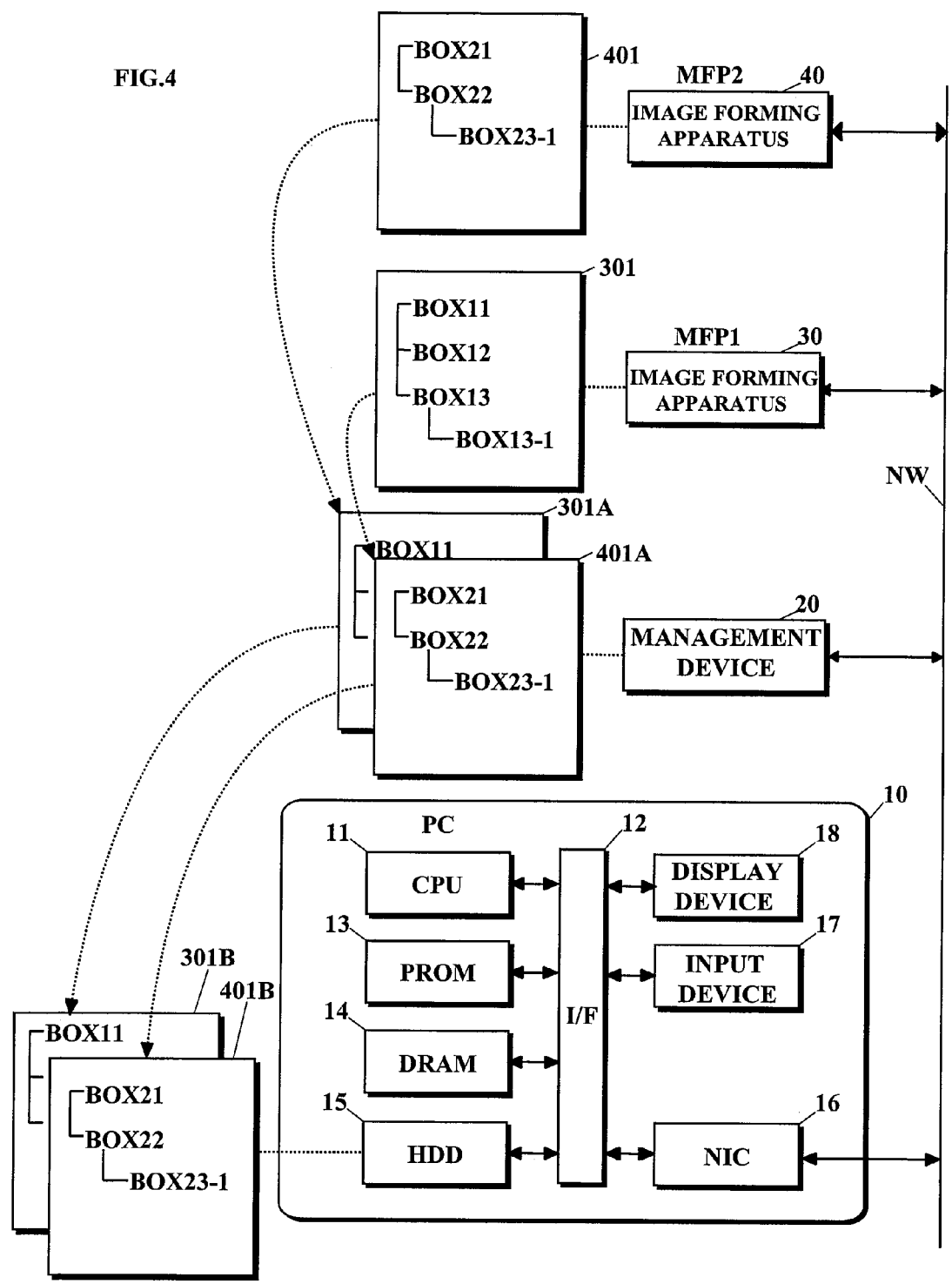

IMAGE FORMING SYSTEM CAPABLE OF CAUSING DOCUMENT BOX INFORMATION OF THE PRINTER DRIVER TO AUTOMATICALLY ADJUST TO A CHANGE IN THE DOCUMENT BOX INFORMATION THAT IS STORED IN AN IMAGE FORMING APPARATUS

INCORPORATION BY REFERENCE

This application is based upon and claims the benefit of priority from the corresponding Japanese Patent Application No. 2008-131469, filed May 20, 2008, the entire contents of which is incorporated herein by reference.

BACKGROUND

1. Field of the Invention

The present invention relates to an image forming system for allowing a document box created on an image forming apparatus to be selected through a graphical user interface (GUI) screen of a printer driver stored in an information processing device, and allowing a print job file and a file related thereto to be saved in the document box.

2. Description of the Related Art

In a conventional image forming system, a user utilizes the GUI screen of a printer driver to manually input a document box name which is stored in an image forming apparatus. Therefore, processes corresponding to the addition, deletion, renaming, and the like of a document box on the image forming apparatus must be manually performed by the user through the GUI screen of the printer driver. This can result in problems in that an erroneous input may cause inconsistency between the document box name in the image forming apparatus and the printer driver.

SUMMARY

The present invention relates to an image forming system capable of causing the document box information of a printer driver to automatically adjust to a change in the document box information that is stored in an image forming apparatus.

According to an embodiment of the present invention, provided are an image forming system including a management device, an image forming apparatus including an auxiliary storage device, and a plurality of information processing devices; these are coupled to one another via a network, with the image forming system being designed as described below.

The management device is designed to: acquire a box information file with respect to a document box created on the auxiliary storage device from the image forming apparatus via the network; and transmit the box information file to each of the plurality of information processing devices in its original format and after conversion thereof into a predetermined format, wherein the plurality of information processing devices each control a printer driver compatible with the image forming apparatus to read the received box information file.

Additional features and advantages are described herein, and will be apparent from the following Detailed Description and the figures.

BRIEF DESCRIPTION OF THE FIGURES

In the accompanying drawings:

FIG. 4 is a schematic block diagram illustrating a hardware design principally of the PC 10 illustrated in FIG. 3.

DETAILED DESCRIPTION

Hereinafter, is a description of an embodiment according to the present invention with reference to the drawings.

Figure 3:
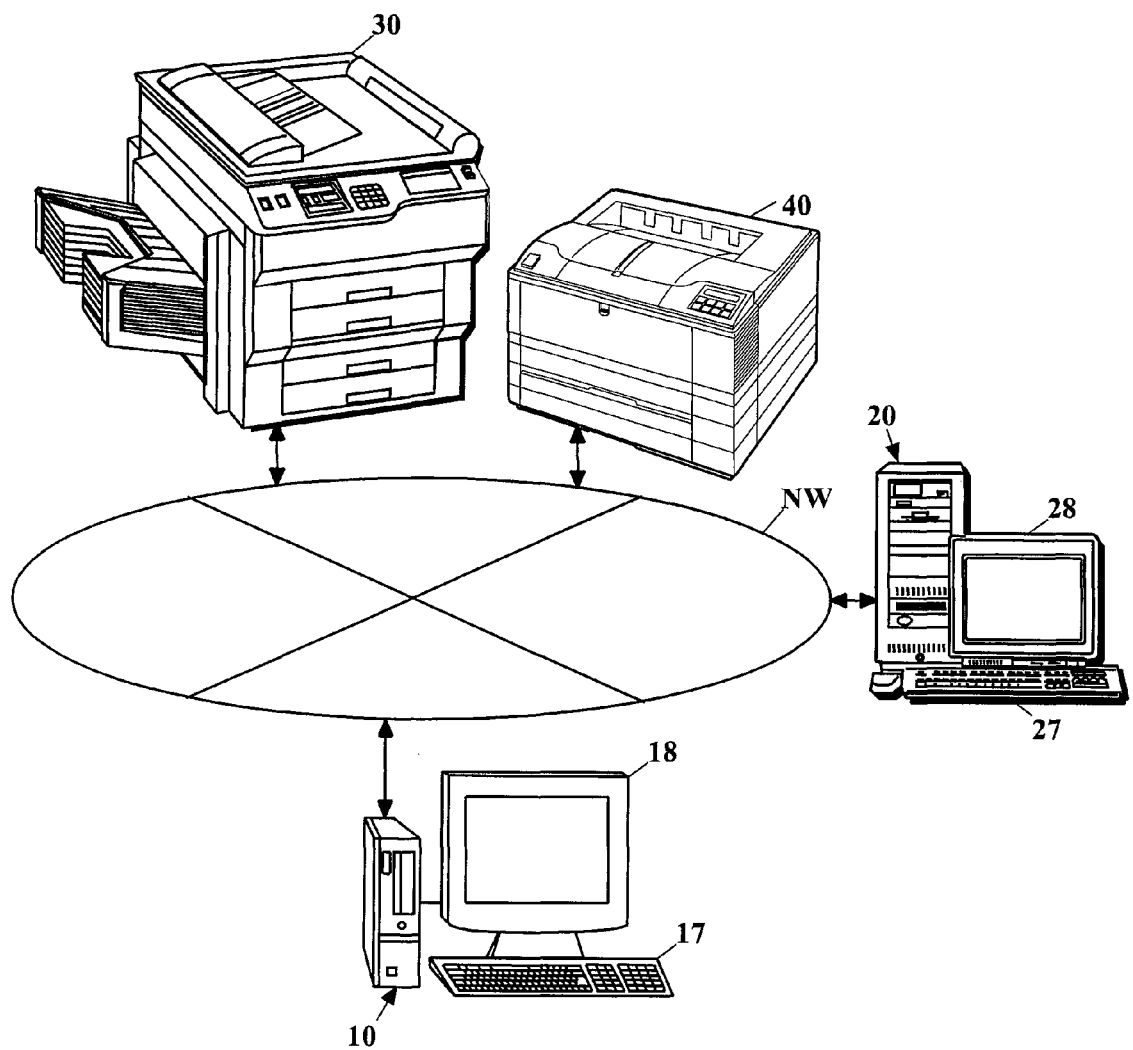
FIG. 3 is a schematic diagram of an image forming system according to an embodiment of the present invention.

FIG. 3 is a schematic diagram of an image forming system according to an embodiment of the present invention. In the illustrated image forming system, a personal computer (PC) 10 serves as an information processing device. The PC 10, a management device 20 and image forming apparatuses 30 and 40 are coupled to one another via a local network NW. For the sake of simplicity, FIG. 3 illustrates a case where only one PC and two image forming apparatuses are coupled to the network NW. The management device 20 is used for centrally managing the plurality of image forming apparatuses that are coupled to the network NW.

FIG. 4 is a schematic block diagram illustrating a hardware design principally of the PC 10 illustrated in FIG. 3.

The PC 10 is a typical computer system, and includes a programmable read-only memory (PROM) 13, a dynamic random access memory (DRAM) 14, a hard disk drive (HDD) 15, a network interface card (NIC) 16, an input device 17, and a display device 18, which are coupled to a CPU 11 via an interface 12. The block 12 collectively represents the plurality of interfaces. The NIC 16 is coupled to the network NW.

The PROM 13 stores a basic input/output system (BIOS) and setting values related thereto. The DRAM 14 is used as a main storage device in a virtual storage system.

The HDD 15 stores an operating system (OS) such as Windows®, a network driver, a printer driver for the selective use of the image forming apparatuses 30 and 40, an application, and data related thereto. The data includes box information files 301B and 401B received from the management device 20, which are described hereinafter.

The input device 17 and the display device 18 are used as an interactive input/output device. The input device 17 includes a keyboard and a pointing device.

The management device 20 has the same hardware configuration as that of the PC 10, and includes a hard disk drive storing an OS, a network driver, an image forming apparatus management application, and data related thereto. The data includes box information files 301A and 401A received from the image forming apparatuses 30 and 40.

Each of the image forming apparatuses 30 and 40 is capable of performing an editing process on its hard disk in response to a user's operation on the control panel. The editing process includes: creating and adding a document box (folder) for storing a file; deleting the created document box; and/or renaming the document box.

Figure 1:
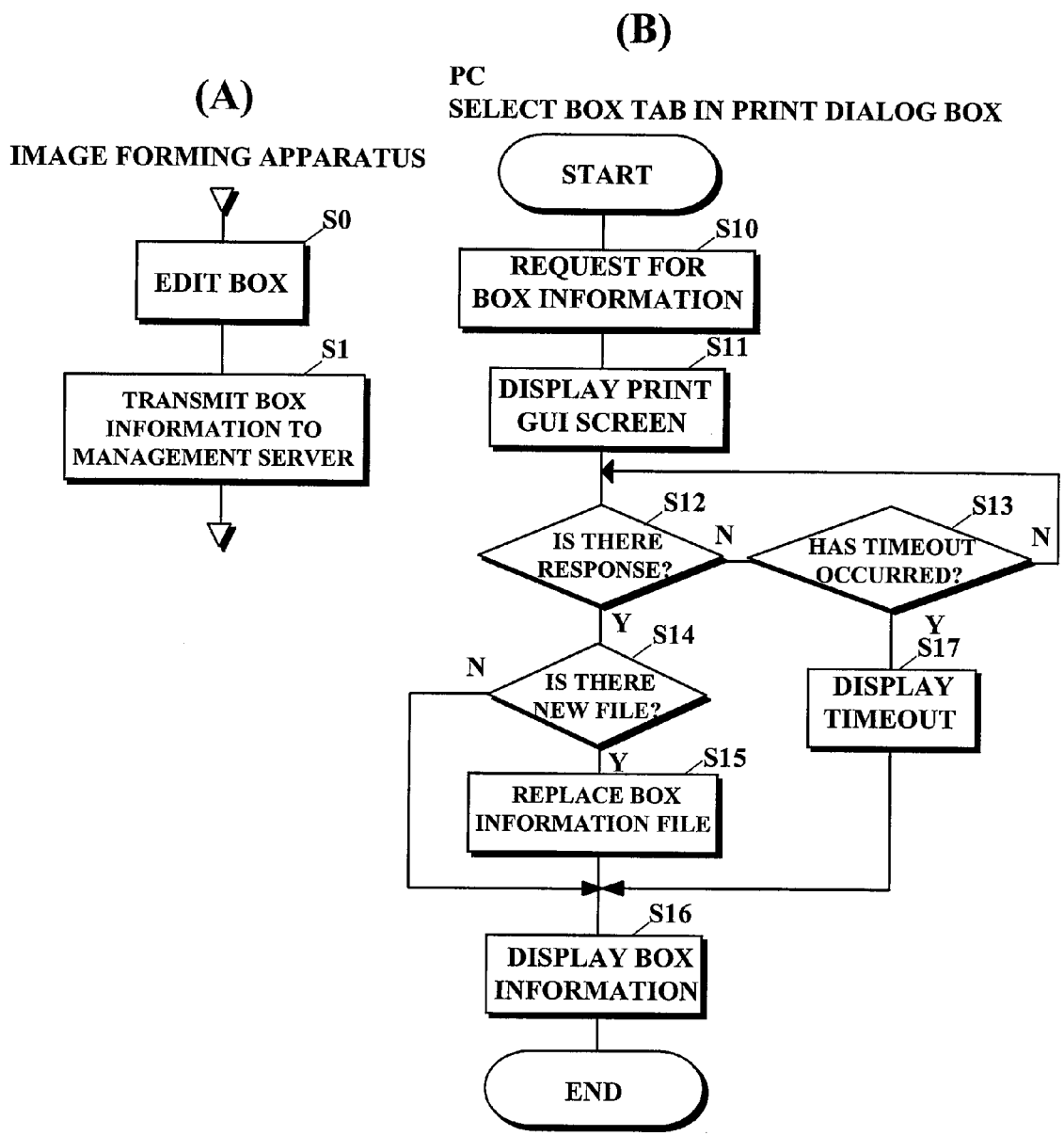
FIG. 1A is a partial flowchart illustrating a box editing process and a post-process therefore, which are performed on an image forming apparatus.
FIG. 1B is a flowchart illustrating a box information update/display process that starts in response to a click on a "BOX" tab of a print dialog box on a PC using a pointing device.

FIG. 1A is a partial flowchart illustrating a box editing process and a post-process therefore, which are performed on the image forming apparatus 30 or 40.

If a box is edited in Step S0, in the subsequent Step S1, the box information file 301 or 401 including a path to the box created on the hard disk is transmitted to the management device 20 along with the name of the image forming apparatus 30 or 40, respectively, which is involved in the editing. The transmission is performed via, for example, a hypertext transfer protocol (HTTP) or a file transfer protocol (FTP).

Upon receiving the box information file 301 or 401, the management device 20 stores the box information file 301 or 401 in a predetermined folder with a name containing the name of an image forming apparatus transmission source or an identification code indicating box information, for example, "MFP2_BoxInfo.txt".

Note that the management device 20 may convert the box information file 301 or 401 that is received into an extensible markup language (XML) format or a comma separated value (CSV) format to be set as the box information file 301A or 401A, respectively.

Note that the box information transmitted from a given image forming apparatus to the management device 20 may be information relating only to the edited portion. In this case, the management device 20 reads the box information file 301A or 401A stored in its hard disk, and reflects the edited portion on the box information file 301A or 401A.

Referring to FIG. 4, information created on the hard disks of the image forming apparatuses 30 and 40 is extracted as the box information files 301 and 401, respectively. And, the box information files 301 and 401 are stored in their original state or the state after having been processed by the management device 20 into its hard disk as the box information files 301A and 401A, respectively.

On the PC 10, a document is created using an application program. A print dialog box is displayed on the display device 18 by clicking on a print item of a file menu thereof. A selection is made between the image forming apparatus 30 or 40 to print the document and/or the box created on the hard disk of the image forming apparatus 30 or 40 is selected to store a print job file or an image data file subjected to bitmap extraction. The selection of the box is performed by clicking a "BOX" tab of the print dialog box as illustrated in FIG. 2 using the pointing device on the PC 10.

The click triggers the start of an operation of an event handler. FIG. 1B is a flowchart illustrating the operation of the event handler. Hereinafter, reference numerals identifying the steps of FIG. 1B are parenthesized.

Figure 2:
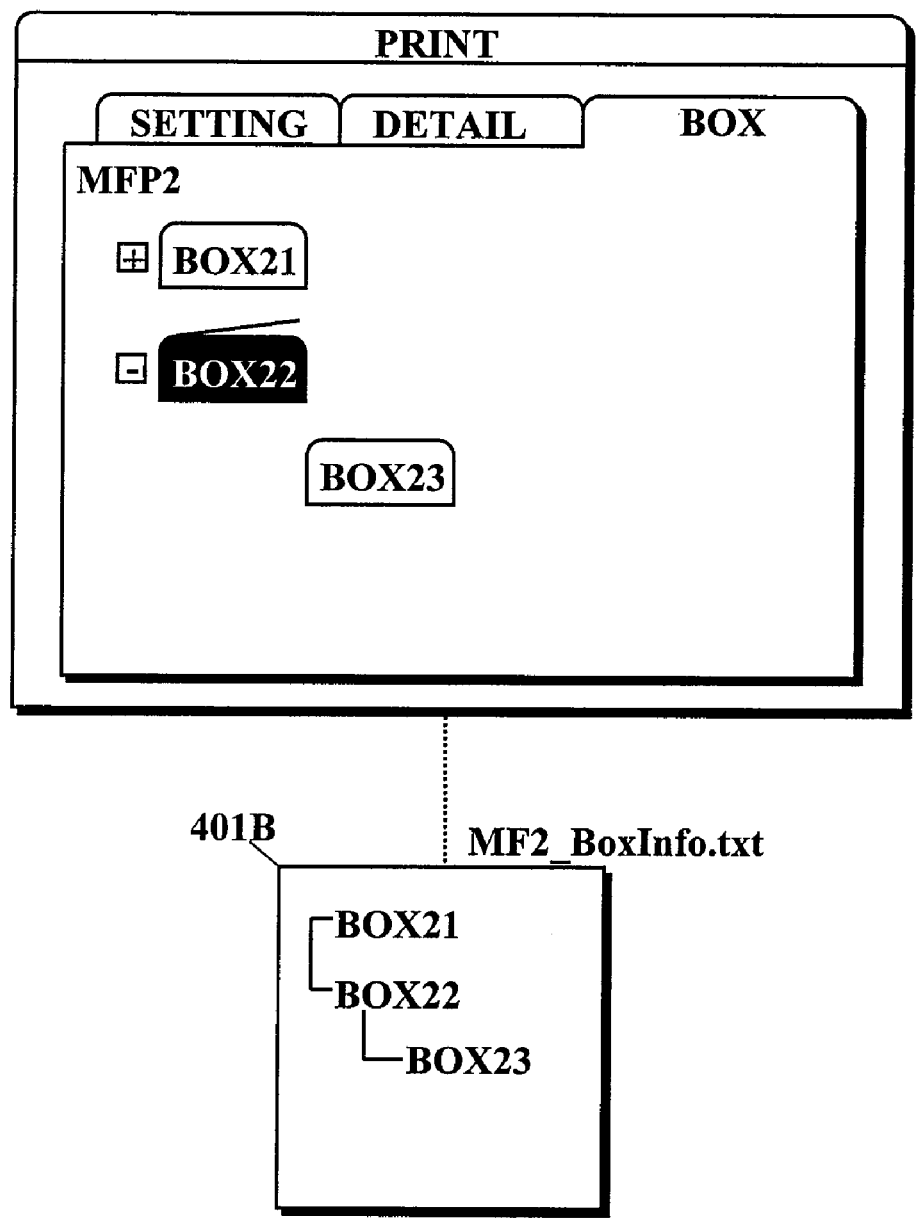
FIG. 2 illustrates the print dialog box that is displayed by clicking on a print item of a file menu of a document created by an application program on the PC, and further clicking on the "BOX" tab.

In this case, the print dialog box of FIG. 2 is associated with the image forming apparatus 40, and contains attributes thereof including the image forming apparatus name "MFP2" and the box information file name "MFP2_BoxInfo.txt" corresponding to the image forming apparatus 40.

(S10) The PC 10 transmits information indicating the box information file request, the name of the box information file 401B, and a timestamp given to the box information file 401B on the PC 10, to the management device 20. That information is expressed, for example, in the form of a Request-URI contained in a HTTP-Request-Message as the following:

"/BoxInfo.cgi?FileName=MFP2_BoxInfo.txt&DateTime=20080324103228".

On the management device 20, the timestamp of the box information file 401B is compared with the box information file 401A stored in its hard disk. If the received timestamp of the box information file 401B is older, the box information file 401A (updated file) is returned to the PC 10 along with the received file name "MFP2_BoxInfo.txt". If the received timestamp of the box information file 401B is newer, information indicating that a file update is not necessary is returned to the PC 10.

(S11) A processing, displaying a sheet with a box tab is performed.

(S12) If a response to the request transmitted in Step S10 is to be waited for the procedure advances to Step S13, and if there is a response, the procedure advances to Step S14.

(S13, S17) If a preset timeout duration is not exceeded, the procedure returns to Step S12, and if exceeded, information indicating that a timeout has occurred is pop-up displayed, and the procedure advances to Step S16.

(S14) If the updated file is received from the management device 20, the procedure advances to Step S15, otherwise the procedure advances to Step S16.

(S15) The corresponding box information file 401B stored in the PC 10 is overwritten by the updated file.

(S16) The box information is graphically displayed on the sheet with the box tab, based on contents of the box information file 401B.

When a box icon on the sheet is clicked on by use of the pointing device, the icon is highlighted as illustrated in FIG. 2 to enter a selected state.

When a setting tab is clicked using the pointing device, a name of the selected box is displayed on the sheet. When a print execution button (not shown) is clicked by the pointing device, the document file is supplied to the printer driver via a GDI of the OS, and converted by the printer driver into PDL data that can be interpreted by the image forming apparatus 40. The PDL data is transmitted as job data to the image forming apparatus 30 with the additional information set in the print dialog box displayed by the printer driver.

If the job data contains information on a storing instruction with respect to the box, the image forming apparatus 30 stores the job data or the image data subjected to bitmap extraction as a file into the box specified by the path.

The management device 20 responds to an instruction input through an input device 27, causing a display device 28 to display the contents and the updated histories of the box information files 301 and 401 stored in the image forming apparatuses 30 and 40, respectively.

The present invention includes various other embodiments. For example, other designs can be used in which the above-mentioned components are each performed.

For example, the acquisition of the box information file performed by the management device 20 may be realized by periodically requesting that the image forming apparatuses 30 and 40 transmits an updated file along with the timestamps of the box information files 301A and 401A. The image forming apparatuses 30 and 40 can compare the timestamps with those of their own box information file, and return the box information file based on a comparison of the timestamps.

Further, the box information file acquired from the image forming apparatuses 30 and 40 by the management device 20 or the box information file acquired from the management device 20 by a plurality of the information processing devices 10 may be a list file of all of the box information files or a partial document box file.

It should be noted that the auxiliary storage device is not limited to the hard disks within the image forming apparatuses 30 and 40. For example, it may be a removable memory such as a USB flash memory which is attached to the image forming apparatuses 30 and 40.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming system, comprising:
   a management device;
   an image forming apparatus including an auxiliary storage device;
   a plurality of information processing devices; and
   the management device, the image forming apparatus, and the plurality of information processing devices being coupled to one another via a network; wherein
   the management device is configured to (i) acquire a box information file that includes a path to a document box created in the auxiliary storage device from the image forming apparatus via the network, (ii) compare a timestamp received from each of the plurality of information processing devices with a timestamp of the box information file retained by the management device, (iii) transmit the box information file, which is assigned a name that includes an image forming apparatus name and an identification code indicating the box information, to each of the plurality of information processing devices in its original format or a predetermined format after a conversion thereof, if the timestamp received from each of the plurality of information processing devices is older, and (iv) transmit information indicating that a file update is not necessary to the plurality of information processing devices, if the timestamp received from each of the plurality of information processing devices is newer; and
   the plurality of information processing devices are each configured to (i) transmit the timestamp of a current box information file to the management device, (ii) update the current box information file with the box information file that has been received from the management device before the document box is displayed on a display device of each of the plurality of information processing devices by the printer driver compatible with the image forming apparatus, and (iii) display the document box based on the updated box information file.

2. The image forming system according to claim 1, wherein:
   the management device is configured to acquire a box information list file with respect to the document box created on the auxiliary storage device from the image forming apparatus via the network; and
   each of the plurality of information processing devices is configured to acquire the box information list file from the management device.

3. The image forming system according to claim 1, wherein:
   the management device is configured to acquire a portion of the box information file with respect to the document box created on the auxiliary storage device from the image forming apparatus via the network; and
   each of the plurality of information processing devices is configured to acquire the portion of the box information file from the management device.

4. The image forming system according to claim 1, wherein the management device is configured to transmit the box information file to the plurality of information processing devices after conversion of the file into a format selected from the group consisting of an XML format and a CSV format.

5. The image forming system according to claim 1, wherein the management device is configured to acquire the box information file with respect to an edited portion from the image forming apparatus via the network.

6. The image forming system according to claim 5, wherein the management device is configured to reflect the box information file with respect to only the edited part on the box information file regarding the image forming apparatus which is stored in the management device.

7. The image forming system according to claim 1, wherein the auxiliary storage device comprises a hard disk within the image forming apparatus and a removable memory attached to the image forming apparatus.

8. The image forming system according to claim 1, wherein the image forming apparatus is configured to transmit, in response to editing of the document box within the auxiliary storage device after the box information file is transmitted to the management device, the box information file including contents of the editing to the management device.

9. The image forming system according to claim 8, wherein the image forming apparatus is configured to transmit the box information file including the contents of the editing to the management device, in response to action selected from the group consisting of an addition, deletion, and renaming of the document box within the auxiliary storage device.

10. The image forming system according to claim 1, wherein the image forming apparatus periodically is configured to transmit the box information file to the management device.

* * * * *